(12) United States Patent
Letschert et al.

(10) Patent No.: US 6,235,103 B1
(45) Date of Patent: May 22, 2001

(54) TANTALUM (V) NITRIDE PIGMENTS, PROCESS FOR THE PRODUCTION THEREOF AND USE THEREOF

(75) Inventors: Hans-Peter Letschert, Hanau; Wilfried Voigt, Rodenbach, both of (DE)

(73) Assignee: Cerdec Aktiengesellschaft Keramische Farben, Frankfurt am Main (DE)

( * ) Notice: Subject to any disclaimer, the term of this patent is extended or adjusted under 35 U.S.C. 154(b) by 0 days.

(21) Appl. No.: 09/510,512

(22) Filed: Feb. 22, 2000

(30) Foreign Application Priority Data

Feb. 23, 1999  (DE) ................................. 199 07 616

(51) Int. Cl.⁷ ........................... C04B 14/00; C01B 21/06
(52) U.S. Cl. ............................. 106/401; 423/409
(58) Field of Search ............................. 106/401; 423/409

(56) References Cited

U.S. PATENT DOCUMENTS

| | | | |
|---|---|---|---|
| 4,333,916 | * 6/1982 | Iwai et al. | 423/409 |
| 5,147,831 | * 9/1992 | Zeiringer | 423/409 |
| 5,284,639 | * 2/1994 | Sommers et al. | 423/409 |
| 5,370,854 | * 12/1994 | Henley et al. | 423/409 |
| 5,376,349 | 12/1994 | Jansen et al. | 423/409 |
| 5,439,660 | 8/1995 | Jansen et al. | 423/263 |
| 5,569,322 | 10/1996 | Jansen et al. | 106/401 |
| 5,693,102 | * 12/1997 | Jansen et al. | 106/401 |
| 5,766,336 | * 6/1998 | Jansen et al. | 106/461 |

FOREIGN PATENT DOCUMENTS

| | | |
|---|---|---|
| 43 17 421 | 12/1994 | (DE) . |
| 0 592 867 | 4/1994 | (EP) . |
| 62225960 | 3/1989 | (JP) . |

OTHER PUBLICATIONS

Von G. Brauer, J. Weidlein and J. Strähle, "Über das Tantalnitrid $Ta_3N_5$ und Das Tantaloxidnitrid TaON", Zeitschrift für anorganische und allgerueine Chemie. Band 348, 1966, pp. 298–308., No Month Available.

Dr. G. Brauer and Dr. J. R. Weidlein, "Synthese und Eigenschaften des roten Tantalnitrids $Ta_3N_5$", Angenwandte Chemie, de, VCH Verlagsgesellschaft, Weinheim, Band 77, 1965, pp. 218–219., No Month Available.

* cited by examiner

*Primary Examiner*—Helene Klemanski
*Assistant Examiner*—Veronica F. Faison
(74) *Attorney, Agent, or Firm*—Wenderoth, Lind & Ponack, L.L.P.

(57) ABSTRACT

Tantalum(V) oxide may be nitrided with ammonia at 700 to 1250° C. to yield tantalum(V) nitride. According to the invention, nitriding and consequently pigment quality are improved by adding at least one pulverulent oxide from the series $SiO_2$, $GeO_2$, $SnO_2$, $TiO_2$, $ZrO_2$ and $HfO_2$ or a pulverulent precursor of such an oxide in a quantity of at least 0.1 wt. %, calculated as oxide, to the tantalum(V) oxide to be nitrided and then nitriding the powder mixture.

12 Claims, No Drawings

TANTALUM (V) NITRIDE PIGMENTS, PROCESS FOR THE PRODUCTION THEREOF AND USE THEREOF

BACKGROUND OF THE INVENTION

1. Field of the Invention

This invention relates to tantalum(V) nitride pigments having improved red pigment colour values. The present invention also relates to the production of the tantalum(V) pigments on the basis of nitriding tantalum(V) oxide with ammonia. The invention finally relates to the use of the tantalum(V) nitride pigments which are improved with regard to colour.

2. Description of the Related Art

Both during use and on disposal, toxicologically questionable constituents may be released from articles coloured or decorated with oxide, sulfide or selenide heavy metal compounds, such as for example cadmium and selenium from cadmium sulfoselenide red pigments. There is accordingly particular interest in using pigments having toxicologically less questionable constituents. Tantalum(V) nitride ($Ta_3N_5$) is an innocuous alternative, but the colour values, in particular brightness, of the pigments obtainable using hitherto known processes do not always meet expectations. Hitherto known production processes either give rise to unsatisfactory colour values or entail the use of special tantalum starting compounds.

According to H. Moureau and C. H. Hamblet (J. Amer. Chem. Soc. 59, 33–40 (1937)), the nitride of pentavalent tantalum may be produced by ammonolysing $TaCl_5$. The nitride obtained in this manner is not pure as it contains oxide constituents. Reaction times are moreover very long. H. Funk and H. Böhland (Z. anorg. allg. Chem. 334, 155–62 (1964)) were able to shorten reaction times by nitriding $(NH_4)TaF_6$. Due to the volatility of $TaF_5$ and $NH_4F$, yields of $Ta_3N_5$ are only low and/or the products contain fluorine. The stated document also disclosed the nitriding of tantalum (V) oxide ($Ta_2O_5$) at 800° C. with ammonia; a nitride containing oxide ($Ta_3N_5(O)$) is formed at 800° C., the colour of which was not stated.

On the basis of Funk and Böhland's investigations, G. Brauer and J. R. Weidlein (Angew. Chem. 77, 218–9 (1965)) reexamined the nitriding of pure tantalum pentoxide with purified ammonia: in the presence of titanium chips as oxygen getter, the reaction requires a reaction time of 36 to 120 hours at 860 to 920° C. These reaction times could not be confirmed when these investigations were replicated (c.f. EP-A 0 592 867): colour formation was not complete, i.e. no further colour shift occurred, until a reaction time of 150 hours had elapsed. However, the tantalum(V) nitride obtained in this manner was red-brown and thus of no interest for colouring purposes.

According to the process described in EP-A 0 592 867, it is possible to obtain tantalum(V) nitride having elevated colour intensity and simultaneously shorten the reaction time. In this process, tantalum(V) oxide is replaced by a tantalum(V) oxide hydrate of the formula $Ta_2O_5$ aq. having a hydrate content (aq. content) in the range from 14 to 17 wt. %. The duration of the nitriding reaction is shortened by adding fluxes to the tantalum oxide hydrate to be nitrided. The pigment obtained in this manner exhibited a red shift in comparison with prior art products and substantially greater colour intensity than products as were obtainable using tantalum(V) oxide.

One disadvantage of the latter-stated process is that commercially obtainable, low cost tantalum(V) oxide could not be used, but only a specially produced tantalum(V) oxide hydrate. As already explained, one disadvantage of prior processes using tantalum(V) oxide was that they yielded products, the colour values of which prevented the use thereof as a red pigment.

SUMMARY OF THE INVENTION

The object of the present invention is accordingly to provide a process for the production of tantalum(V) nitride if possible having improved colour values in comparison with prior art products, which process is based on nitriding tantalum(V) oxide with ammonia.

DESCRIPTION OF THE PREFERRED EMBODIMENTS

A process has been discovered for the production of tantalum(V) nitride pigment by nitriding pulverulent tantalum(V) oxide with ammonia at 700 to 1250° C., which process is characterised in that at least one pulverulent oxide from the series $SiO_2$, $GeO_2$, $SnO_2$, $TiO_2$, $ZrO_2$ and $HfO_2$ or a pulverulent precursor of such an oxide is added in a quantity of at least 0.1 wt. %, calculated as oxide, to the tantalum(V) oxide to be nitrided and the powder mixture is then nitrided. The dependent process claims relate to preferred embodiments.

It has utterly surprisingly been found that the nitriding of tantalum(V) oxide may be substantially improved if an inert oxide from the series $SiO_2$, $GeO_2$, $SnO_2$, $TiO_2$, $ZrO_2$ and $HfO_2$ or a pulverulent precursor of such an oxide is added to the pulverulent tantalum(V) oxide before nitriding. Red pigments are obtained when the homogeneous powder mixture is nitrided.

The term "inert" is taken to mean that the stated oxides or precursors thereof substantially do not themselves form any nitrides under the nitriding conditions.

The quantity of these oxides or precursors used may vary within wide limits: Using a quantity of less than 0.1 wt. %, relative to tantalum(V) oxide, is possible, but in such cases the effect is, of course, still slight. A quantity of at least 1 wt. % of oxide or a precursor thereof, calculated as oxide, is conventionally preferred. It is also possible to add more than 20 wt. % of one or more of the stated oxides or precursors thereof to the tantalum(V) oxide, but it must be noted that the resultant pigments then become increasingly lighter. The quantity used preferably amounts to 2 to 15 wt. %, particularly preferably 3 to approx. 10 wt. %.

The effect according to the invention of promoting nitriding and giving rise to products having better colour values may be achieved by using just one of the stated oxides or precursors thereof. It is, however, also possible to use a combination of two or more such compounds. The phrase "precursor of such an oxide" is taken to mean compounds which are converted into the oxide below the nitriding temperature, i.e. during heating of the powder mixture. Suitable precursors of the oxides are accordingly in particular oxide hydrates, nitrates, carbonates and salts of lower carboxylic acids.

According to particularly preferred embodiments of the process according to the invention, silica, zirconium dioxide or a precursor of these oxides, in particular basic zirconium carbonate, or mixtures of the stated compounds, is/are added to the tantalum(V) oxide.

It has been established that it is particularly advantageous to use one or more of the stated oxides or precursors thereof, as well as the tantalum(V) oxide to be nitrided, in the most finely divided form possible. Conventional commercial pigment grade products are suitable as the tantalum(V) oxide. The oxides or precursors thereof particularly preferably added to the tantalum(V) oxide to be nitrided are those having specific surface areas (measured by the BET method to DIN 66131 using $N_2$) of at least 5 $m^2/g$, preferably of greater than 50 $m^2/g$ and particularly preferably of around 200 $m^2/g$. Oxides produced by grinding processes and by precipitation processes or by flame hydrolysis may, for example, be used. $ZrO_2$, as is obtainable by thermal decomposition of zirconium silicate with subsequent leaching of the silica matrix, is also suitable.

Equipment known to person skilled in the art may be used to produce the powder mixture: the powder mixture may suitably be homogenised with any desired mixing and/or grinding apparatus by means of which the tantalum oxide to be nitrided is uniformly dispersed with the added oxide(s) or precursors thereof. Effective homogenisation is also made possible in nitriding reactors in which the powder mixture is kept in constant motion.

Nitriding conveniently proceeds by passing ammonia or an inert gas containing ammonia through a reactor containing the powder mixture at 700 to 1250° C., preferably at 850 to 950° C. According to a particularly preferred embodiment, nitriding is performed in a rotary tube reactor. It has been established that it is convenient to increase the flow velocity of the ammonia as the reaction temperature rises. In this manner, it is possible to prevent secondary reactions which reduce colour quality. A flow velocity of 0.5 m/s, in particular of 1 to 5 m/s, is preferred.

The powder mixture to be nitrided may additionally contain fluxes in order to reduce the nitriding temperature and shorten the required duration of the reaction. Suitable fluxes are ammonium salts of carbonic acid, lower carboxylic acids or a boric acid; boric acids and boric anhydrides; alkali metal and alkaline earth metal halides. One or more fluxes in finely divided form may be added to the nitriding mixture to be nitrided. Where fluxes are added to the powder mixture, the quantity used is conveniently 1 to 50 wt. % and preferably 5 to 20 wt. %, relative to the powder mixture. If desired, water-soluble fluxes may be leached out of the pigment obtained after nitriding.

The pigments produced according to the invention are distinguished by exceptionally good L*a*b* values in the CIE-Lab system (DIN 5033, part 3). Tantalum(V) nitride pigments with such colour values have not been obtainable using the hitherto known process. The tantalum(V) nitride pigments according to the invention are accordingly characterised by a content of at least one oxide from the series $SiO_2$, $GeO_2$, $ZnO_2$, $TiO_2$, $ZrO_2$ and $HfO_2$ in a quantity of at least 0.1 wt. %. Tantalum(V) nitride pigments according to the invention may also be obtained, apart from by the process according to the invention, by nitriding other tantalum(V) compounds, in particular tantalum(V) oxide hydrates or tantalum(V) oxidenitrides.

On the basis of the test criteria set out below, preferred pigments according to the invention exhibit the following L*a*b* colour values: L* less than 40; a* greater than 35, in particular 40 to 45; b* 40 to 50. Colour was measured using PVC plastisols coloured with the pigment, wherein 0.7 g of pigment and 2 g of plastisol were mixed and dispersed in a pigment grinding machine; 300 $\mu$m thick coats of the pastes were gelled for 10 minutes at 140° C. As is evident from the colour values, the pigments are distinguished by an elevated red value, elevated brightness and elevated colour intensity. Another advantage of the oxides present in the pigments according to the invention as a result of the process is the improvement of the flowability of the pigments.

The pigments according to the invention may be used for the production of glass colorants and for colouring glazes stovable at below 800° C.(sic) and for colouring plastics, paints and cosmetics. Glass colorants are obtainable by mixing pigments with fluxes, in particular glass frits. When it is to be used for decorating a substrate by direct printing or for producing transfers, the mixture of pigment and flux is first dispersed in a liquid to pasty printing medium.

The advantages of the invention consist in its being possible to use commercially available tantalum(V) oxide for nitriding and nevertheless obtain pigments of elevated brightness. The oxides present in the pigment, providing that they are present in the powder mixture to be nitrided in a quantity of around/below 10 wt. %, give rise to only a slight lightening of colour tone, but they do increase brightness and flowability. The oxides or precursors thereof to be added to the tantalum(V) oxide to be nitrided moreover accelerate the reaction.

The invention will now be illustrated by means of the following Examples and Comparative Examples. However, the following Examples and Comparative Examples should not limit the scope of the appended claims.

Production of the pigments:

EXAMPLE 1 (B1)

300 g of conventional commercial tantalum(V) oxide (purity >99.9%, $d_{50}$=0.5 $\mu$m) were combined with 6% of silicon dioxide (F 500 from Quarzwerke Frechen, $D_5$=3.4 $\mu$m) and homogenised. The mixture was then heated to 910° C. with ammonia (1300 l/h) for 12 hours in a silica glass rotary tube ($d_1$=14 cm) (rotational speed of rotary tube: 1 rpm). A red powder was obtained as the product.

EXAMPLE 2 (B2)

300 g of conventional commercial tantalum(V) oxide (purity >99.9%) were combined with 9% of F 500 silicon dioxide and homogenised. The mixture was then heated to 910° C. with ammonia (1300 l/h) for 12 hours in a silica glass rotary tube (rotational speed of rotary tube: 1 rpm). A red powder was obtained as the product.

EXAMPLE 3 (B3)

300 g of conventional commercial tantalum(V) oxide (purity >99.9%) were combined with 4 wt. % of precipitated silica (Sipernat 22S from Degussa) and homogenised. The mixture was then heated to 910° C. with ammonia (1300 l/h) for 12 hours in a silica glass rotary tube (rotational speed of rotary tube: 1 rpm). A red powder was obtained as the product.

EXAMPLE 4 (B4)

300 g of conventional commercial tantalum(V) oxide (purity >99.9%) were combined with 3 wt. % of precipitated silica (Sipernat 22S) and 4 wt. % of F 500 silicon dioxide and homogenised. The mixture was then heated to 910° C. with ammonia (1300 l/h) for 12 hours in a silica glass rotary tube (rotational speed of rotary tube: 1 rpm). A red powder was obtained as the product.

EXAMPLE 5 (B5)

300 g of conventional commercial tantalum(V) oxide (purity >99.9%) were combined with 10 wt. % of zirconium dioxide with an average grain diameter 2.4 μm and homogenised. The mixture was then heated to 910° C. with ammonia (1300 l/h) for 12 hours in a silica glass rotary tube (rotational speed of rotary tube: 1 rpm). A red powder was obtained as the product.

EXAMPLE 6 (B6)

300 g of conventional commercial tantalum(V) oxide (purity >99.9%) were combined with 5 wt. % of basic zirconium carbonate (Kynoch Kaapstreek) and 6 wt. % of precipitated silica (Sipernat 22S) and homogenised. The mixture was then heated to 910° C. with ammonia (1300 l/h) for 12 hours in a silica glass rotary tube (rotational speed of rotary tube: 1 rpm). A red powder was obtained as the product.

COMPARATIVE EXAMPLE 1 (VB1)

300 g of conventional commercial tantalum(V) oxide (purity >99.9%) were placed in a silica glass rotary tube. The oxide was then heated to 910° C. with ammonia (1300 l/h) for 12 hours in a silica glass rotary tube (rotational speed of rotary tube: 1 rpm). A brown-red powder was obtained as the product.

COMPARATIVE EXAMPLE 2 (VB2)

a) Production of tantalum oxide hydrate:

10 g of tantalum(V) chloride are dissolved at boiling in 400 ml of conc. hydrochloric acid. The mixture is then diluted with 80 ml of water and tantalum oxide hydrate is precipitated at pH 7 with conc. ammonia solution. The precipitate is washed until free of chloride, suspended with ethanol and dried at 120° C. The x-ray amorphous product has a residual water content of 14.9 wt. % (after calcining at 1000° C.).

b) Nitriding:

1 g of this product is then placed in a corundum boat and heated to 820° C. for 80 hours in a stream of ammonia (9 l/h). A red product is obtained.

c) Colour values:

The colour values of the plastic, coloured in the conventional manner with an identical quantity (0.7 g of pigment and 2 g of PVC plastisol), are: L* 35.21; a* 38.03; b* 41.44. Colour property testing of the powders obtained:

The powders produced in accordance with the above-stated instructions were incorporated into a PVC plastisol and their colouring properties tested. To this end, 0.7 g of the particular sample and 2 g of plastisol were mixed and dispersed in a pigment grinding machine. 300 μm thick coats of the pastes were produced with a slider. Gelation was performed by heating to 140° C. within 10 minutes. The colour values were measured with a spectrophotometer and converted into CIE-Lab system values (DIN 5033, part 3). The colour values are stated in the following table.

TABLE

| Test | L* | a* | b* |
|---|---|---|---|
| B 1 | 37.61 | 36.82 | 44.67 |
| B 2 | 37.48 | 36.80 | 45.21 |
| B 3 | 37.88 | 42.41 | 48.30 |
| B 4 | 39.56 | 43.17 | 50.24 |
| B 5 | 31.12 | 31.92 | 30.90 |
| B 6 | 35.04 | 41.06 | 43.50 |
| VB 1 | 37.99 | 26.35 | 27.13 |

TABLE-continued

| Test | L* | a* | b* |
|---|---|---|---|
| VB 2 | 35.21 | 38.03 | 41.44 |

Comparison of the Examples with Comparative Example 1 reveals that colour formation is significantly improved by the addition of the oxides.

Comparison of Examples 3, 4 and 6 according to the invention with Comparative Example 2 reveals that, given optimal selection of the oxide(s) or precursors, higher a values (red values) are obtainable than in the absence thereof.

What is claimed is:

1. A process for producing tantalum(V) nitride pigment comprising nitriding pulverulent tantalum(V) oxide with ammonia at 700 to 1250° C., wherein at least one pulverulent oxide from the group consisting of $SiO_2$, $GeO_2$, $SnO_2$, $TiO_2$, $ZrO_2$ and $HfO_2$ and/or at least one pulverulent precursor of such oxide(s) is/are added in a quantity of at least 0.1 wt. %, calculated as oxide, to the tantalum(V) oxide to be nitrided and the resultant powder mixture is then nitrided.

2. The process according to claim 1, wherein one or more pulverulent oxides from the group consisting of $SiO_2$ and $ZrO_2$ and/or one or more precursor(s) of $SiO_2$ and $ZrO_2$ are added in a quantity of 1 to 20 wt. % to the tantalum(V) oxide to be nitrided.

3. The process according to claim 1, wherein the oxides and/or precursors thereof having a specific surface area of at least 10 m²/g are added to the tantalum(V) oxide.

4. The process according to claim 1, wherein nitriding is performed at 850 to 950° C.

5. The process according to claim 1, wherein 2 to 10 wt. % of a pyrogenic or precipitated silica having a specific surface area measured by the BET method using $N_2$ in the range from 150 to 700 m²/g are added to the tantalum(V) oxide to be nitrided.

6. The process according to claim 1, wherein $ZrO_2$ is derived from basic zirconium carbonate.

7. The process according to claim 1, wherein the powder mixture to be nitrided further comprises one or more fluxes from the group consisting of ammonium salts of carbonic acid, a lower carboxylic acid, boric acids, boric anhydrides, alkali metal halides and alkaline earth metal halides.

8. The process according to claim 1, wherein nitriding is performed in a rotary tube.

9. A tantalum(V) nitride pigment comprising at least one oxide from the group consisting of $SiO_2$, $GeO_2$, $SnO_2$, $TiO_2$, $ZrO_2$ and $HfO_2$ in a quantity of at least 0.1 wt. %.

10. A tantalum(V) nitride pigment produced by the process according to any one of claims 1 to 8, which is used in the production of glass colorants and glazes stovable at below 700° C. and for colouring plastics, paints and cosmetics.

11. The process according to claim 2, wherein one or more pulverulent oxides from the group consisting of $SiO_2$ and $ZrO_2$ are added in a quantity of 2 to 15 wt.% to the tantalum(V) oxide to be nitrided.

12. The tantalum(V) nitride pigment according to claim 9, which is used in the production of glass colorants and glazes stovable at below 700° C. and for colouring plastics, paints and cosmetics.

* * * * *